No. 612,091. Patented Oct. 11, 1898.
W. W. DOUGLASS.
CURRENT MOTOR.
(Application filed Aug. 11, 1897.)
(No Model.) 3 Sheets—Sheet 1.
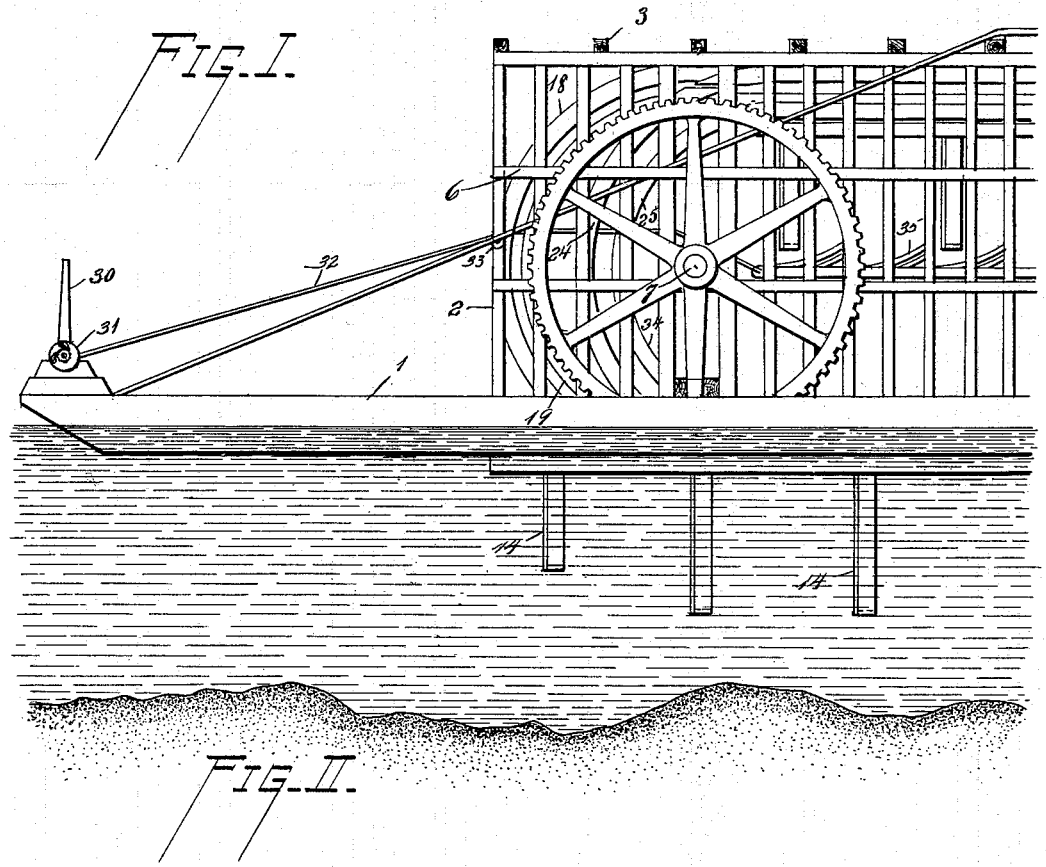
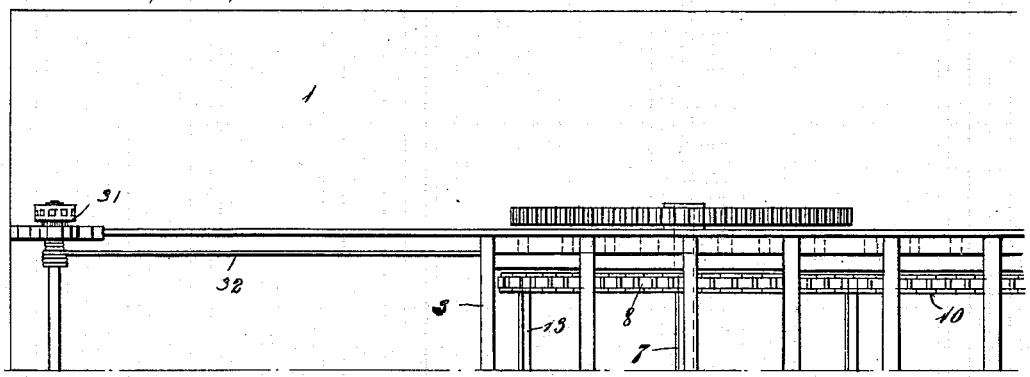
Witnesses
Inventor
William W. Douglass.
By John Wedderburn.
Attorney No. 612,091. Patented Oct. 11, 1898.
W. W. DOUGLASS.
CURRENT MOTOR.
(Application filed Aug. 11, 1897.)
(No Model.) 3 Sheets—Sheet 2.
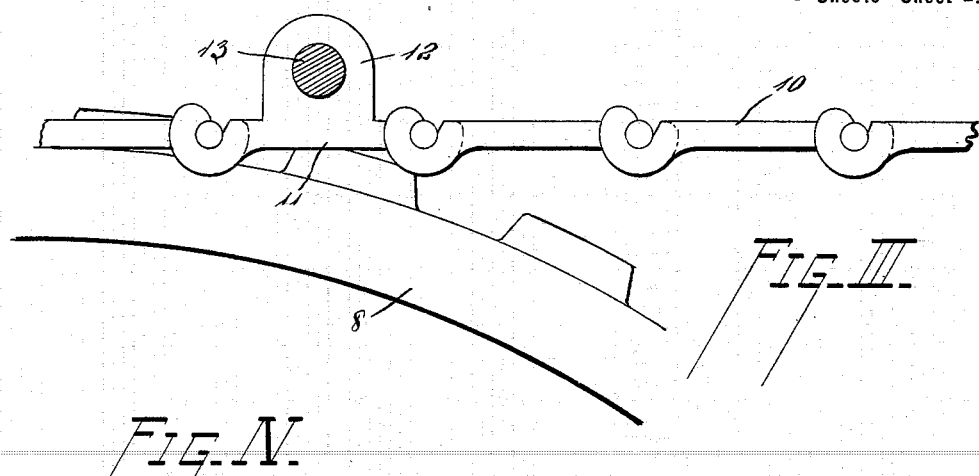
Fig. III.
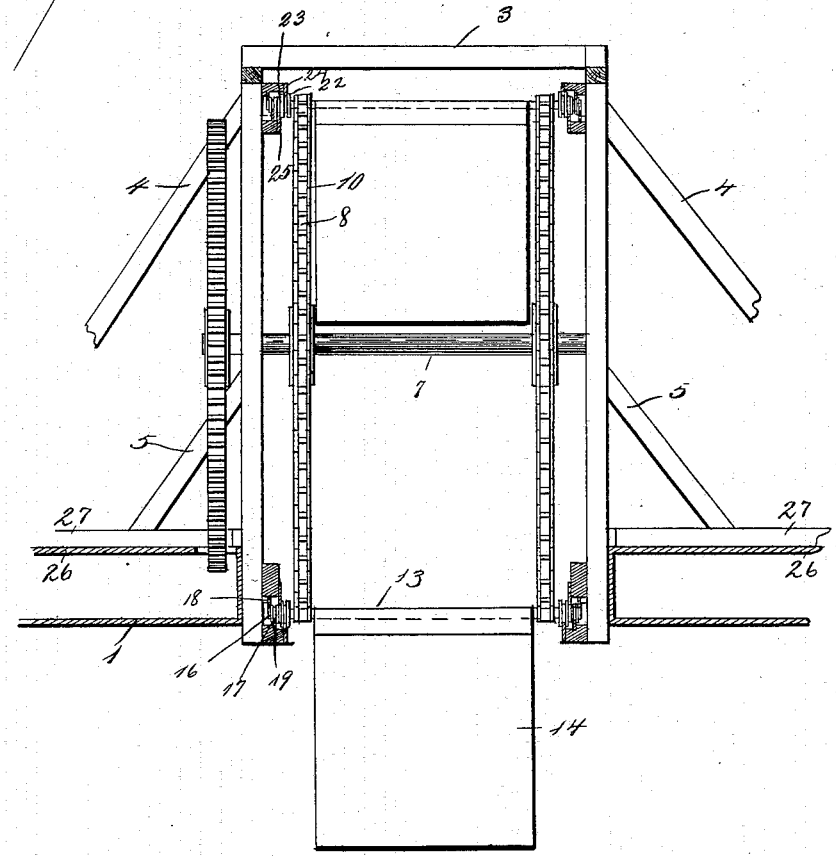
Fig. IV.
Witnesses
G. C. Conner
Victor J. Evans
Inventor
William W. Douglass
By John Wedderburn
Attorney No. 612,091. Patented Oct. 11, 1898.
W. W. DOUGLASS.
CURRENT MOTOR.
(Application filed Aug. 11, 1897.)
(No Model.) 3 Sheets—Sheet 3.
Fig. V.
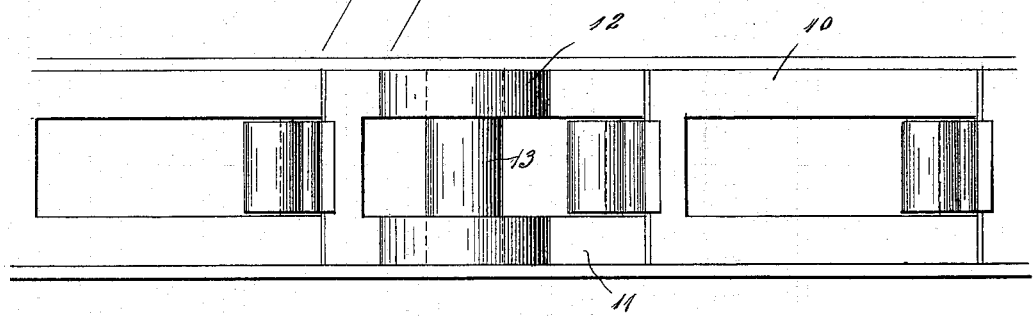
Fig. VI.
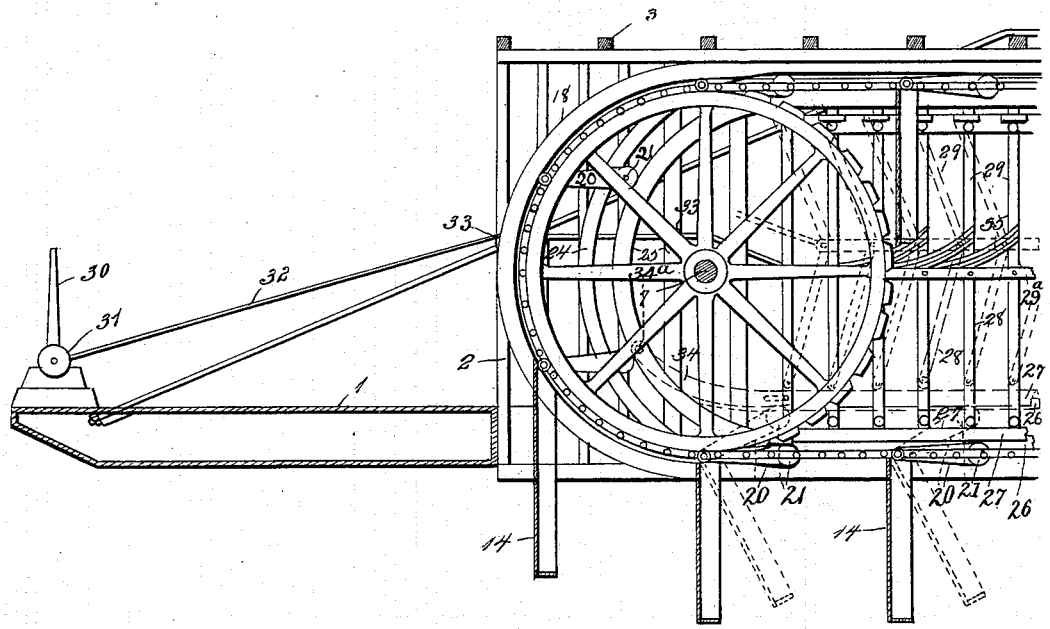
Witnesses
G. C. Conner.
Victor J. Evans
Inventor
William W. Douglass.
by John Wedderburn.
Attorney

UNITED STATES PATENT OFFICE.

WILLIAM W. DOUGLASS, OF KANSAS CITY, MISSOURI.

CURRENT-MOTOR.

SPECIFICATION forming part of Letters Patent No. 612,091, dated October 11, 1898.

Application filed August 11, 1897. Serial No. 647,868. (No model.)

*To all whom it may concern:*

Be it known that I, WILLIAM W. DOUGLASS, of Kansas City, in the county of Jackson and State of Missouri, have invented certain new and useful Improvements in Current-Motors; and I do hereby declare the following to be a full, clear, and exact description of the invention, such as will enable others skilled in the art to which it appertains to make and use the same.

This invention is an improvement in current-motors, the object of the same being to provide a machine of this character which will utilize a current or running body of water for the purpose of giving power to operate machinery.

The primary object of the invention is to provide a current-motor for use in generating electricity, thereby giving a power which will furnish electricity much cheaper than by the use of steam.

To the above ends the invention consists in a current-motor, the same comprising in its construction a scow upon which is built a superstructure supporting transverse shafts having sprocket and gear wheels mounted thereon, chains passing over the sprocket-wheels and carrying paddles, arms connected to the paddles and guided by tracks to move the said paddles into the water, and mechanism for changing the relative position of the paddles, all as will be hereinafter fully set forth, and specifically pointed out in the claims.

In the drawings forming part of this specification, Figure 1 is a side elevation of a current-motor constructed in accordance with my invention. Fig. 2 is a plan view. Fig. 3 is an enlarged detail view of one of the sprocket-wheels and a part of the chain which engages therewith. Fig. 4 is a vertical sectional view through the motor. Fig. 5 is an enlarged detail view of a section of the sprocket-chain. Fig. 6 is a vertical longitudinal section view through the motor.

In carrying out my invention I provide a scow or float, (designated by the numeral 1,) which is provided longitudinally with a vertical opening or well extending therethrough. Upon this scow or float are secured uprights or posts 2, connected at their upper ends by cross-beams 3 and further strengthened by inclined braces 4 and 5, as well as by longitudinal beams 6. Thus the frame or superstructure forms the support for the mechanical part forming the motor, the posts or uprights being arranged at opposite sides of the well.

7 7 designate transverse shafts which are located near opposite ends of the well, being journaled in suitable bearings secured to the uprights of the supporting-frame. Upon each shaft are mounted sprocket-wheels 8 8, located at the inner side of the uprights, the said shafts being extended at one end to receive a large gear-wheel by which the power is transmitted. Over the sprocket-wheels pass sprocket-chains 10, composed of links connected to each other in the usual manner, and at regular distances the said sprocket-chains are provided with links 11 11, having upward extensions or pieces 12, forming bearings for transverse shafts 13, extending from one chain to the other. The shafts 13 carry the paddles or blades 14, that are acted upon by the water to move the sprocket-chain and move the sprocket-wheels, the paddles being rigidly secured to said shafts. The shafts are extended at each end and carry flanged rollers 16 and 17, which travel over track-rails 18 and 19, supported by the superstructure or frame, the said rails serving to prevent any sag in the chains between the sprocket-wheels and forming continuous ways for guiding the chains, being extended at each end in curves corresponding with the curve of the wheels. To the extended ends of the shafts 13, which support the paddles, are connected arms 20, to the outer ends of which are secured bearing-pins 21, carrying grooved rollers 22 and 23, which travel over tracks 24 and 25 therefor, the horizontal portion of the said tracks being to one side of the tracks over which travel the rollers 16 and 17.

It will be here noted that the rollers 22 and 23 are larger than the rollers 16 and 17, and consequently the tracks over which they travel are farther apart. The curved portion of the tracks for the outer ends of the arms extends beyond the tracks which support the shaft carrying the paddles in order that the said arms may serve to at all times keep the paddles perpendicular.

With so much of the invention as is herein described it is apparent the paddles entering the water below the scow will be caught by the water and carried along, the strength of the current serving to turn the sprocket-wheels, and the rotation of the shafts upon which the sprocket-wheels are mounted is transmitted by way of the gear-wheel to suitable gearing, (not shown,) which may be connected with a dynamo or other machine. This provides a motor which is comparatively simple and requires practically no expense in running the same, therefore making it possible to utilize the strength of a current or running body of water to produce power for the purpose of running machinery.

In order to provide for moving the paddles out of operative position for the purpose of stopping the motor, the lower horizontal parts 26 of the rails 25 are movable vertically, and to this end have a pin-and-slot connection at each end, (see dotted lines in Fig. 6,) with the lower curved portions numbered 34 and pivoted, as at 34ª, to the stationary or upper part of the track 25. The movable part 26 is carried by the beam 27, elevated by means of toggle-levers 28 and 29, pivoted to the draw-bars 29ª, or operated through the medium of handle or lever 30 of capstans or windlasses 31 at opposite ends of the float or scow, the connection between the draw-bars and drum of the capstan or windlass being by means of cables 32, which pass over suitably-disposed guide-rollers 33.

In connection with the draw-bars are a series of curved guides 35, the connecting-pins between the draw-bars and toggle-levers being extended into the guides.

The operation of the movable rail will be readily apparent, and it will be understood that when the arms which control the position of the paddles are guided upon the movable rail and the latter is elevated the said paddles will be caused by the current to assume substantially the position shown in dotted lines, Fig. 6, with the rollers of the arms pressing against the elevated draw-bars, and consequently present a downward and forwardly sloping surface in order to afford as little resistance as possible to the flow of the water. The result is the operation of the motor ceases or the operation is so extremely slow, even when uncoupled from the dynamo, that there will be no appreciable wear and tear on the operating parts. In fact, such slow movement may be desirable, because it will serve to keep the motor in working order by preventing the bearings from rusting.

It will be understood, of course, that in case the current is not strong wings could be attached to the forward end of the scow and diverge therefrom in order to concentrate the flow upon the paddles.

Having thus described the invention, what is claimed as new is—

1. In a current-motor, the combination, substantially as hereinbefore described, of a float or scow having a well, a frame upon the same, transverse shafts journaled thereon, sprocket-wheels upon said shafts, chains connecting said wheels, transverse shafts carried by said chains and provided with paddles and roller-carrying arms, elliptical endless tracks for the shaft-rollers, and elliptic endless tracks within the first-named tracks and having their end portions curved concentrically with respect to the corresponding portions of the first-named tracks; the lower longitudinally-extending portion of said inner tracks being adjustable vertically in order to permit the pressure of the water upon the paddles below the same to throw them to their inoperative or inclined position.

2. In a current-motor, the combination with a float or scow having a well, of a superstructure or supporting-frame built upon the scow, transverse shafts journaled in bearings carried by the superstructure, sprocket-wheels mounted upon the shafts and connected by sprocket-chains, shafts or rods extending between the sprocket-chains and beyond the same, tracks forming guides over which travel rollers mounted upon the extended ends of the shafts or rods, the horizontal portions of the tracks being connected at their ends by curved tracks, arms connected to the shafts or rods, and track-rails forming guides for the arms, the horizontal portions of said track-rails being connected by curved sections extending beyond the curved sections of the other rails, and paddles secured to the transverse shafts or rods; together with a vertically-movable rail, pivoted sections connecting the same with the curved rails which form the guides for the arms, and means for raising and lowering the movable rail, substantially as shown and for the purpose set forth.

3. In a current-motor, the combination of a scow having a well and a superstructure or supporting-frame, sprocket-wheels mounted upon shafts journaled in the supporting-frame and connected by chains, transverse rods or shafts extending between the chains and beyond the same, tracks forming guides for the rods, paddles secured to the said rods, arms extending from the rods or shafts, track-rails forming guides for the rods, the curved portions of the track-rails being in different arcs; together with a vertically-movable track-rail at the lower part of the apparatus and connected to the track-rails and which guide the arms, toggle-levers connected to the movable rail, draw-bars for operating the toggle-levers, guide-rails with which the pivot-pins of the toggle-levers engage, and means for operating the toggle-levers, substantially as shown and for the purpose set forth.

4. In a current-motor, the combination with a float or scow, a frame upon the same, transverse shafts journaled thereon, sprocket-wheels mounted upon said shafts, chains connecting said wheels, transverse shafts carried by said chains and provided with paddles and roller-carrying arms, elliptic endless tracks for the shaft-rollers, and elliptic endless tracks within the first-named tracks, and embodying vertically-adjustable lower portions which are substantially horizontal, pivoted sections having their pivot ends in alinement with the stationary end portions of said tracks, and the opposite ends pivoted to said adjustable portions, slotted guide-tracks, toggle-joints between the movable and immovable sections of the tracks, a bar connecting the links coincidental with their points of connection, a drum and capstan connected to said bar, and means to lock the same at any desired point of adjustment, substantially as described.

In testimony whereof I have signed this specification in the presence of two subscribing witnesses.

WILLIAM W. DOUGLASS.

Witnesses:
J. F. HAZEL,
WM. GOODWIN.